March 10, 1942.    D. C. PORTER ET AL    2,275,650
AUTOMATIC PRESELECTING AND TUNING APPARATUS
Filed July 22, 1938    5 Sheets-Sheet 1
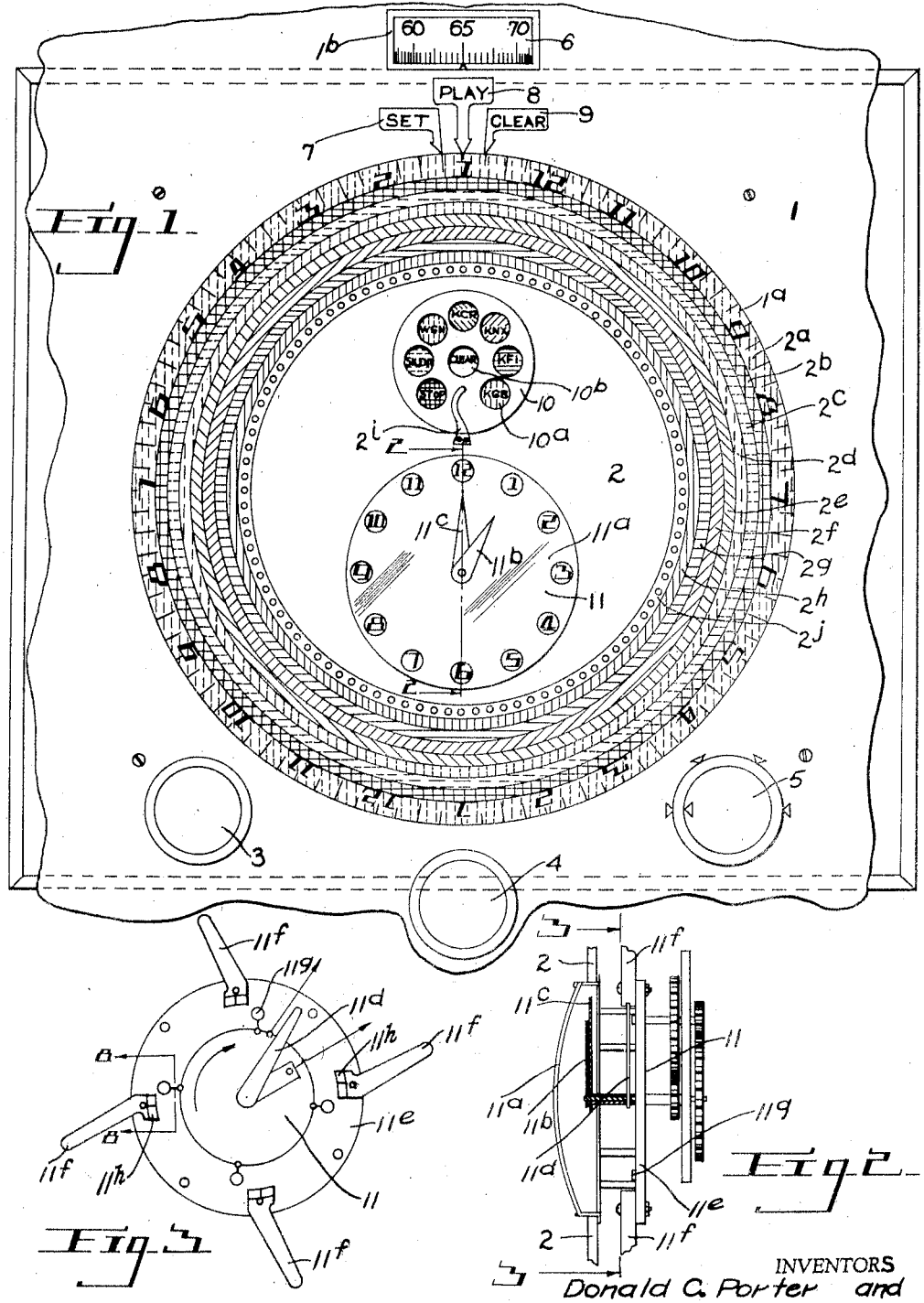
INVENTORS
Donald C. Porter and
Frank W. Sloan
BY A. B. Bowman
ATTORNEY.

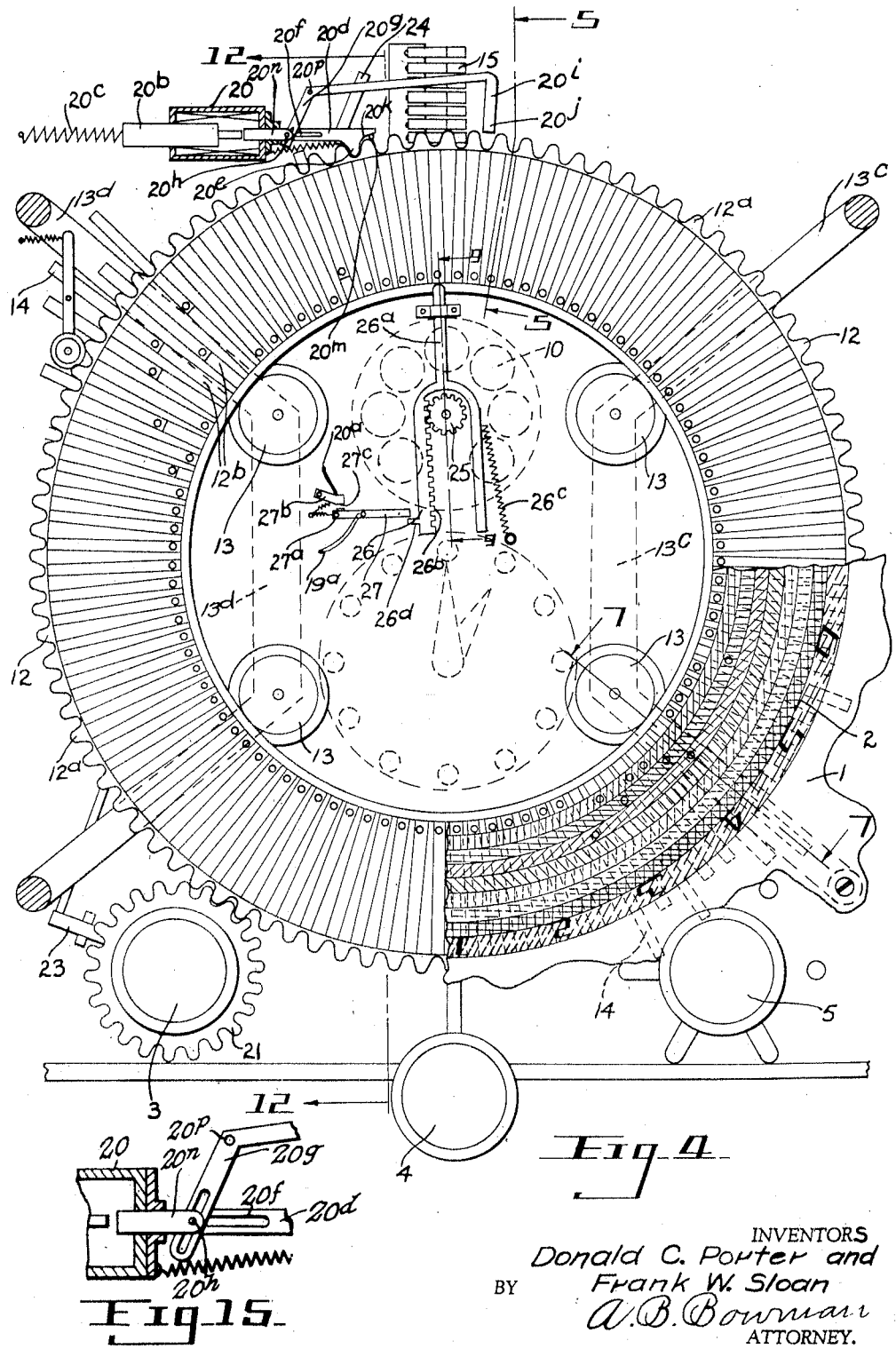

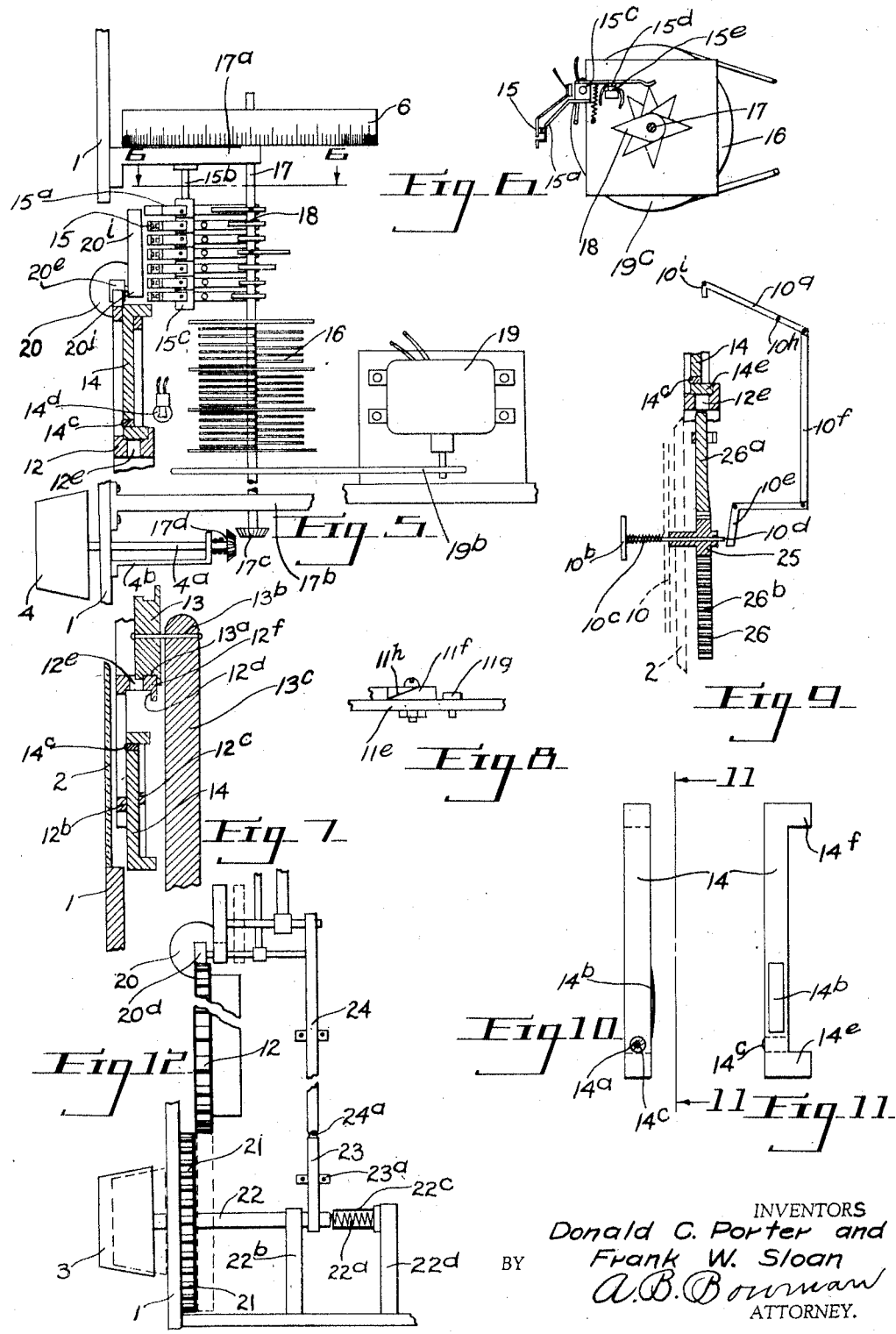

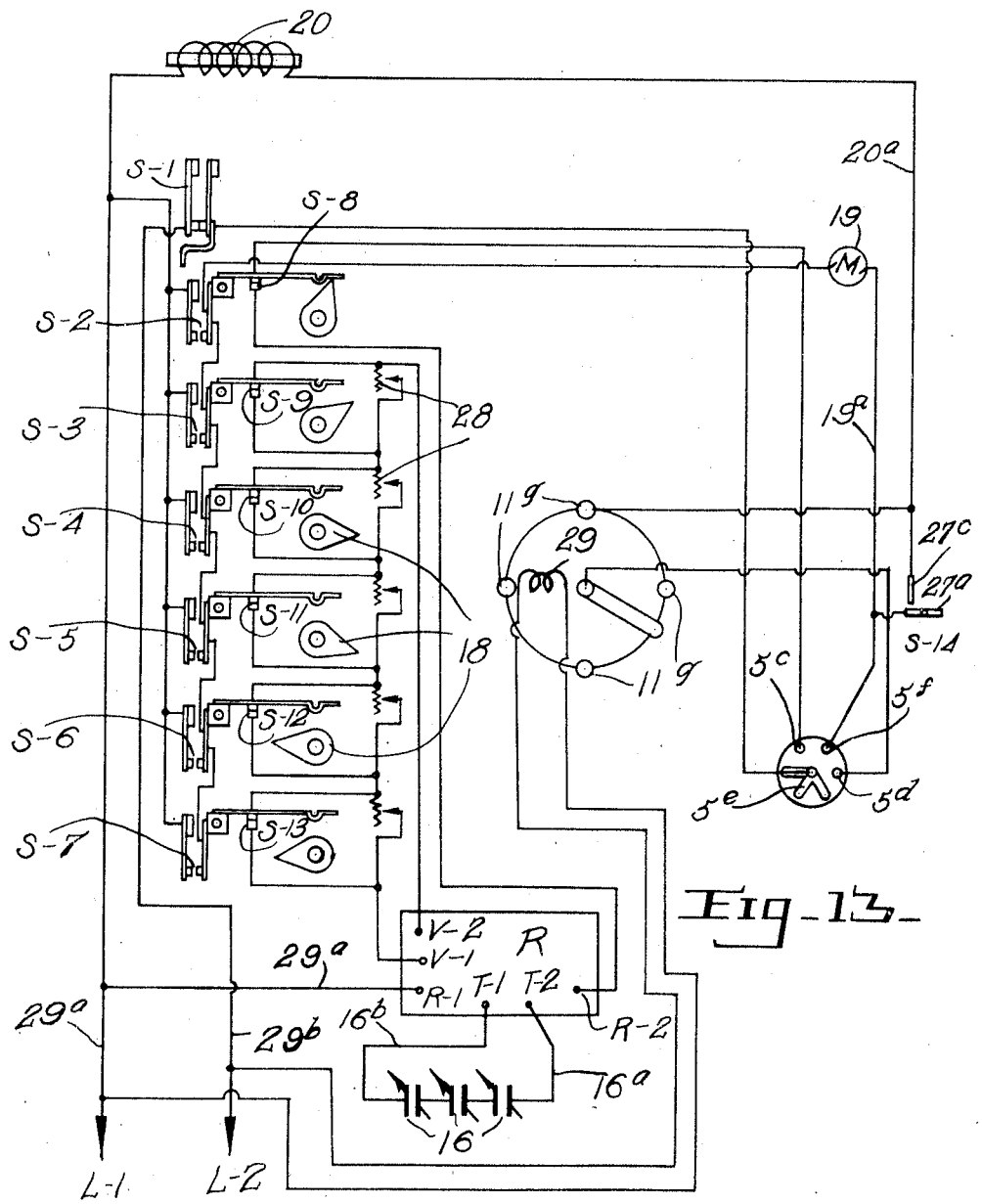

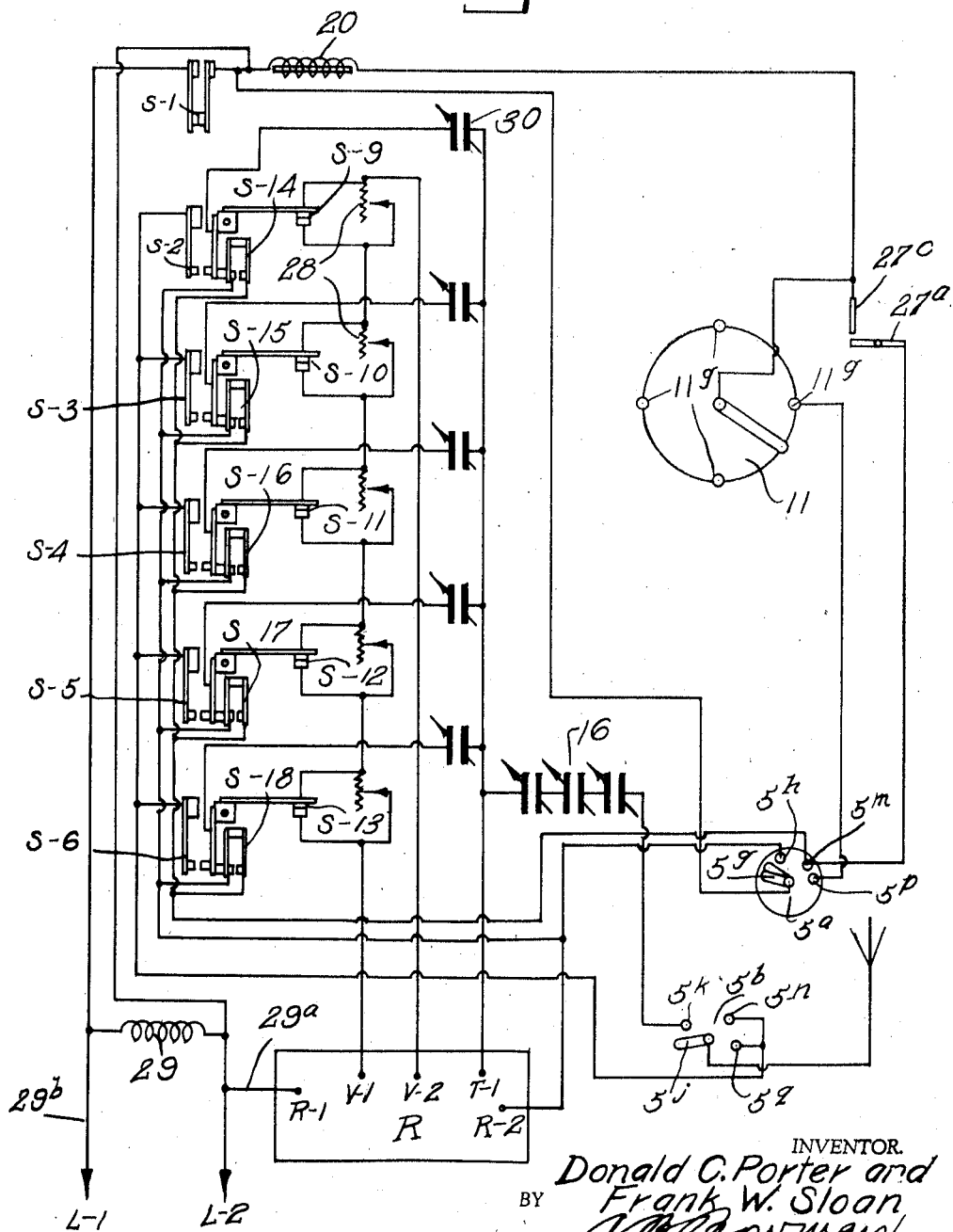

Patented Mar. 10, 1942

2,275,650

UNITED STATES PATENT OFFICE 2,275,650

AUTOMATIC PRESELECTING AND TUNING APPARATUS

Donald C. Porter and Frank W. Sloan, San Diego, Calif.

Application July 22, 1938, Serial No. 220,671

7 Claims. (Cl. 250—40)

Our invention relates to an apparatus for automatically preselecting and timing radio receiving sets for programs of varying selections, or may be used for turning on or off controls for signs, motors, signal systems, programs for schools and other similar purposes, and the objects of our invention are:

First, to provide an apparatus of this class to be used in connection with radio receiving sets for automatically preselecting and timing a large and varied number of stations in continuous or interrupted order;

Second, to provide an apparatus of this class in which a relatively large number of predetermined selections may be properly timed and the apparatus is in very compact and simple form in accordance with the number of preselected selections;

Third, to provide an apparatus of this class in which the apparatus controlled may be either readily controlled by the apparatus automatically or may be manually controlled independent of the automatic action;

Fourth, to provide an apparatus of this class in which the separate selections are controlled by definite period impulses so that the point is definite and not intermediate;

Fifth, to provide an apparatus of this class in which the preselections may be read or determined from the outer face of the apparatus;

Sixth, to provide an apparatus of this class in which conforming colors are utilized in connection with the preselection to provide convenience and ease in preparing a preselected program;

Seventh, to provide an apparatus of this class which eliminates the usual plugs, removable pins, buttons and the like;

Eighth, to provide an apparatus of this class in which definite impulses are used for the separate periods so that a program may be prepared on a condenser padder type of tuning radio receiving set without motor driven condensers being necessary;

Ninth, to provide an apparatus of this class in which time periods of continuous stations may be operated then interrupted time periods where no stations are operated and then continued in continuous or interrupted order;

Tenth, to provide an apparatus of this class in which a dial is used to set up the program;

Eleventh, to provide an apparatus of this class in which the 360° unidirectional motor driven condenser is utilized so that the selector approaches the stopping switch from the same direction at all times, therefore providing uniformly and accurately in the starting and stopping actions; and Twelfth, to provide an apparatus of this class which is very simple and economical of construction, efficient in its action and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a front elevational view of our apparatus showing the general dial, clock face, control knobs and a fragmentary portion of the casing; Fig. 2 is a sectional view taken from the line 2—2 of Fig. 1 and showing some of the parts and portions in elevation to facilitate the illustration; Fig. 3 is a sectional view taken from the line 3—3 of Fig. 2 showing some of the parts and portions in elevation to facilitate the illustration; Fig. 4 is a partial fragmentary front elevational view of my apparatus on an enlarged scale and showing a portion of the front face removed and disclosing the selecting apparatus; Fig. 5 is a sectional view taken from the line 5—5 of Fig. 4 and showing some of the parts and portions in elevation to facilitate the illustration; Fig. 6 is a sectional view taken from the line 6—6 of Fig. 5; Fig. 7 is a sectional view taken from the line 7—7 of Fig. 4; Fig. 8 is a sectional view taken from the line 8—8 of Fig. 3; Fig. 9 is a sectional view taken from the line 9—9 of Fig. 4 showing some of the parts and portions in elevation to facilitate the illustration; Fig. 10 is an enlarged side elevational view of one of the finger members; Fig. 11 is a side elevational view at right angles thereto taken from the line 11—11 of Fig. 10; Fig. 12 is a sectional view taken from the line 12—12 of Fig. 4 and showing some of the parts and portions in elevation to facilitate the illustration and showing the knob portion in varying positions by dash line; Fig. 13 is a diagrammatic view of the electric wiring circuit and their cooperating parts; Fig. 14 is a diagrammatic view of the same in a modified form, and Fig. 15 is an enlarged diagrammatic fragmentary sectional view of the solenoid and finger return showing parts and portions in elevation.

Similar characters of reference refer to similar parts and portions throughout the several views of the drawings:

The casing member 1, face member 2, rearranging knob 3, manual tuning knob 4, selecting knob 5, manual tuning index 6, setting index 7, playing index 8, clear index 9, dialing member 10, clock mechanism 11, selecting plate 12, selecting plate supporting wheels 13, finger members 14, contact members 15, plate condenser 16, shaft 17, cams 18, motor 19, solenoid 20, gear 21, shaft 22, arm members 23, bar members 24, finger operating gear 25, finger operating gear rack 26, finger operating trip 27, volume control 28, and clock coil 29 constitute the principal parts and portions of our automatic preselecting and tuning apparatus.

The casing member 1 may be any vertical plate and may be the front side of a radio receiving set casing when the apparatus is used for preselecting and timing different radio programs. It is provided with a circular opening 1a in which is supported the face member 2 as shown best in Figs. 1 and 7 of the drawings. This face member 2 is preferably composed of a circular glass plate and it is provided with the characters 1 to 12 from the middle at the lower side upwardly in one direction and from the middle at the top side downwardly in the opposite direction as shown best in Fig. 1 of the drawings. These characters are positioned in a section 2a and the portion from 6 to 6 around the lower portion is painted purple to indicate the night, while the upper portion from 6—6 is white or clear to indicate the day time. Inwardly of this annular section 2a is another painted section 2b which is painted black and is the color designation for the stop control. Inwardly from this section 2b is another section 2c which is painted gray and is for the purpose of designating the silent portion. Inwardly from this section 2c is another section 2d which is painted purple and designates a station which is shown here as WGN. Inwardly from this section 2d is another annular section 2e which is painted green and compares with the station designated KCR. Inwardly from this section 2e is another section 2f which is painted brown and compares with the station KNX. Inwardly from this section 2f is another section 2g which is painted blue and conforms with the station KFI and inwardly from this section 2g is another similar section 2h which is painted red and conforms with the section KGB. It will be here noted that these sections conform in color with the bottom of the holes 10a on the dials 10 shown in Fig. 1 of the drawings, it being noted that the holes 10a in the dial 10 are of the proper size to be engaged by the finger for dialing similar to the dialing of an ordinary telephone dial. Secured to this face member 2 immediately below the dial 10 and extending up over the lower side of the dial at the middle is a finger stop member 2i which serves to stop the finger when dialing the dial 10. Inwardly of the section 2h and concentric therewith is a plurality of small openings 2j which are for indicating the station being played. Positioned adjacent the perimeter of the face member 2 at the left side is a prearranging knob 3 which is for the purpose of prearranging the selections to be selected as will be hereinafter described. Positioned at the middle below the member 2 is the manual tuning knob 4 shown best in Figs. 1 and 5 of the drawings and positioned to the right in the member 1 is the selecting knob 5. The casing 1 is provided with an opening 1b which is rectangular in shape through which protrudes the manual tuning index member 6 and positioned at the upper side of the face member 2 a little to one side of the middle is a setting index 7 which is rigidly supported in the member 1. On the opposite side of the center is another index which is the index to indicate "clear" designated 9 and positioned between these two and pointing toward the middle of the upper side is the playing index 8, all as shown best in Fig. 1 of the drawings. Positioned in the face member 2 immediately below the dial member 10 and in the middle of the face member is the clock face 11a of the clock 11. This clock face 11a is of conventional type with the characters one to twelve in the conventional form and positioned over the face are the hour hand 11b and minute hand 11c shown best in Figs. 1 and 2 of the drawings. The block 11 is or may be any conventional electric clock for keeping proper time. It is provided, however, in connection with the hand shaft with another hand at the back portion designated 11d and positioned backwardly of this hand 11d is a plate member 11e which is provided with four extended angularly aranged arms 11f as shown best in Figs. 2 and 3 of the drawings. Positioned forwardly of the plate 11e and backwardly of the hand 11d are a plurality of electrical contacts 11g. These contact members 11g are adapted to be engaged by a contact on the hand 11d in its revolution simultaneously with the minute hand of the clock causing four electric contacts with each revolution of the minute hand. Positioned backwardly of the casing 1 and face member 2 and revolubly mounted on the wheels 13, four in number, as shown best in Fig. 4 of the drawings, is the selecting plate 12 which is an annular plate provided with gear teeth 12a at its periphery. Positioned on the shaft 22 connected with the knob 3, as shown best in Fig. 12 of the drawings, is a gear member 21 which meshes with the gear teeth 12a on the plate 12 as shown best in Fig. 4 of the drawings. This gear 21 is shifted inwardly and outwardly of mesh with the teeth 12a with the shifting of the shaft 22 as shown by solid and dash lines in Fig. 12 of the drawings. The end of the shaft 22 is supported on a spring 22a which permits its being shifted by compressing spring 22a, the spring 22a tending to hold the gear 21 out of mesh and the knob outwardly as shown by solid lines in Fig. 12 of the drawings. The selecting plate 12 is provided with a plurality of radiating slots 12b, one between each pair of gear teeth and conforming with the holes 2j in the base member 2 with their inner ends positioned under the holes 2j. Mounted in each of these slots 12b is one of the finger members 14. These finger members are slidable in these slots to varying positions so that the holes 14a therein are positioned directly under one of the color sections on the face 2, some of the finger members being shifted outwardly as shown in Fig. 4 of the drawings. Each of these finger members is provided with a friction spring 14b which is adapted to engage the side walls of the slots 12b and tends to hold the finger member 14 in any position that it is left in the slots 12b. Positioned in the hole 14a in each of the finger members 14 is a piece of glass 14c which pieces of glass 14c are adapted to direct the rays of light from lamps 14d so that these members 14c can be readily seen through the color strips 2a to 2h on the outer face of the member 2 as hereinbefore described. There may be a plurality of these lights 14d positioned under the electric plate 12. Each of these finger members 14 is provided with a downwardly extending lug portion 14e at its inner end and with a downwardly extending lug 14f at its outer end and these finger members are supported in the selecting space 12 by means of cross bars 12b at their upper sides and cross bars 12c at their lower sides shown best in Fig. 7 of the drawings, and when these key members are in their inward positions, their inner ends rest in slots 12e and are adapted to be engaged by a member 26a secured to the finger operating rack 26 shown best in Fig. 4 of the drawings and adapted to extend through the hole 12e. This member 26a is integrally secured to the finger operating rack 26 which is provided with teeth 26b which mesh with the gear 25, which gear 25 is operated by the dial 10 for shifting the key members to varying positions depending upon the movement of the dial in setting the particular finger member for the particular station, or object to be timed. This rack member 26 is provided with a spring 26c which tends to draw it back as soon as the dial is released, all as shown best in Fig. 4 of the drawings. This rack member 26 is also provided with an extended lug 26d on one side which is adapted to engage a trip member 27, which trip member 27 is provided with contacts 27a which engage another contact 27b with each movement of the rack member 26 when dialing the dial member 10. The trip member 27 is pivoted intermediate its ends at 27c and is provided with a wire 19a which connects with the electric power and with the selecting tuning knob 5, shown best in Fig. 13 of the drawings. Connecting with the contact 27b is a wire 20a which connects with the solenoid 20 as shown best in Fig. 13 of the drawings.

The selecting plate 12 is supported in its revoluble movement by means of four selecting plate supporting wheels 13. Each of these wheels is provided with a groove 13a, the portion 13a being annular and fitting in the portion 12d. The portion 12f is annular and fits in the groove 13a in each of the wheels 13. These wheels 13 are each supported by means of a pin 13b, which pins are secured in supporting members 13c and 13d, which extend outwardly past the selecting plate 12 and are secured to the casing member 1 and are shown best in Figs. 4 and 7 of the drawings. The solenoid 20 is provided with a core 20b supported by a spring 20c and positioned for engagement with the other end of the core 20b is a plunger 20n with a bifurcated end which is provided with a pin 20h in which is mounted a slotted end of a lever 20g which is provided with an upwardly extending end portion to which is rigidly connected a trip bar 20i, at a pivot point 20p the extended end 20j of the trip member 20i being adapted to engage the outer end of the finger member 14 and shift inwardly after the lug 20e has shifted the plate 12 carrying the key into proper position with the operation of the solenoid 20. This bar member 20d is provided with a cam surface 20k which is adapted to engage a pin 20m Fig. 4 for raising the bar 20d and at the same time it shifts the plate 12 so that it raises it out of engagement with the teeth 12a at the termination of the shift of one notch. This bar 20d is provided with the slot 20f in which is shiftably mounted a pin 20h which is secured to the lever 20g. This lever 20g is shifted by the core 20b until the pin 20h raises the end of the slot 20f before the bar 20d is operated.

Connected with this trip member 20g is the one end of the member 24 which connects with the prearranging knob as will be hereinafter described. This bar 24 is connected at one end by toggle joints 24a with an arm member 23, which arm member 23 is shiftable at point 23a and is pivotally connected with the shaft 22 at its opposite ends. This shaft 22 is shiftably and revolubly mounted in a support 22b and its lower end is adapted to engage the compression spring 22a at its lower end which is mounted in well 22c which is mounted on a support 22d, thus providing means for shifting the bar 24 by the shifting of the member 22 longitudinally and compressing the spring 22a when the knob 3 to which the shaft 22 is secured is depressed as shown by dash lines in Fig. 12 of the drawings. Secured on this shaft 22 is a gear member 21 which meshes with the gear teeth 12a on the selecting plate 12 when the shaft 22 is shifted inwardly by means of the knob 3 shown best in Fig. 12 of the drawings, thus providing means for turning the plate 12 and at the same time shifting the bar 20d and the member 20j out of engagement with the teeth on the plate 12. In order to provide a device for clearing the position of the operating finger in case of a change or mistake, there is provided a clearing knob member 10b longitudinally shifted in a hub of the gear 25 shown best in Fig. 9 of the drawings with a spring 10c interposed between the knob and the dialing member 10. This shaft 10d is adapted to engage a bell crank member 10e which is pivotally connected at its opposite end with a lever 10g which is pivotally mounted at 10h and on the opposite end of which is mounted a pin member 10i, the extended end of which is adapted to engage the end of the key 14 and thrust it back into its original position upon the compression of the clearing knob 10b. Positioned some distance back of the casing member 1 and journalled in supports 17a and 17b, which supports are supported from the casing member 1 is the shaft 17. Secured near the upper end of this shaft 17 is the manual tuning index wheels 6, shown best in Fig. 5 of the drawings. Secured on this shaft 17 below the index 6 in spaced relation to each other are the cam members 18. In this case we have shown seven of these cam members. Also mounted on this shaft 17 below said cam members is a plate condenser 16 which is operated by the motor 19 by means of belt 19b over a sleeve 19c secured to the shaft 17. Secured on the lower end of this shaft 17 is a bevel gear 17c which is adapted to mesh with another bevel gear 17d mounted on a longitudinally shiftable shaft 4a shiftably mounted on a support 4b secured to the casing 1 and connected with the outer end of the shaft 4a outwardly of the casing 1 is the manual tuning knob 4 which is adapted to revolve the shaft 17 independent of the motor 19 when the bevel gear 17d is shifted into meshing relation with the bevel gear 17c. The plate condenser 16 is electrically connected with the radio receiving set R by means of electric conducting wires 16a and 16b. The electric clock 11 is connected with the main source of electrical energy by means of the clock coil 29 across the wires 29a and 29b from a source of electrical energy and the wire 29a connects with the one side of the solenoid 20 shown best in Fig. 13 of the drawings. Mounted on the support 17a is a shaft 15b upon which is pivotally mounted a plurality of insulation members 15c which are preferably in cube form.

In the modified form of construction as shown by the wiring diagram in Fig. 14 of the drawings there is provided a structure in which the cams 18 and their connecting contacts are omitted and fixed condensers 30 are used for operation in connection with the plate condenser 16.

Also the silent contact points are omitted so that there are only six sets of contacts instead of seven, as shown in Fig. 13 and there are provided a plurality of starting contacts 31 in connection with the contacts as shown best in Fig. 14 of the drawings. It will be noted that the wiring is changed as shown by diagram in Fig. 14 to conform to these changes. It will also be noted that in lieu of the dial 5 there are provided two separate dials, one back of the other designated 5a and 5b in Fig. 14 of the drawings, the dial 5a having two fingers and the dial 5b having the other finger, while in the Fig. 13 the one dial has the three fingers.

The operation of our automatic preselecting and tuning apparatus as applied to a radio receiving set is substantially as follows: The clock 11 as shown best in Figs. 1, 2, and 3 of the drawings is a timing device suitable for providing definite time contacts. In this case each fifteen minutes to correspond to the regular fifteen minute program. This clock 11 has a conventional dial and is used for time keeping as well as the radio receiving set control. When the radio receiving set switch member 5, Fig. 1 is on the automatic position the impulses of each period are sent through a solenoid 20 shown in Fig. 4 of the drawings which moves the large selecting plate 12 around one notch for each quarter hour. This selecting plate 12 is divided into sections to represent each quarter hour during the day of twenty-four hours. At each division is located the shiftable signal member 14 which is adjustable and adapted to be positioned at various points from the full in or near the center to full out or maximum extension. The movement of these finger members is controlled or set at specific points by the dial 10 by which the station selecting is controlled or tuned in advance. There are as many fingers 14 assembled on the plate as there are quarter hours in the twenty-four hours. Each of these finger members may be set independently to play any of the stations shown at any period of the twenty-four hours as set up in advance. The setup as shown has three operating arrangements as shown; first, manual tuning, second instant dial tuning and third, automatic preset program tuning.

Considering first the manual tuning non-automatic unit, the switch or electric tuning knob 5 is tuned to the first contact which is marked "manual." This completes the circuit to the radio receiving set as shown by diagrammatic view of the wiring in Figs. 13 and 14 of the drawings which makes the radio receiving set selective to any program from stations capable of being received by the radio receiving set. These stations are tuned in at will by manually grasping the manual tuning knob 4 and pushing the same in to engage the bevel gear 17c and 17d as shown in Fig. 5 of the drawings. The knob 4 is then turned either direction rotating the condenser 16 shown in Fig. 5. The bevel gear 17d, condenser 16 and manual tuning index 6 all shown on Fig. 5 rotate as a unit and the desired station is tuned in according to graduations on the manual tuning index 6 shown near the upper side of Fig. 1 of the drawings. During the manual operation, the clock operates as a time piece only. The selecting plate 12 in such case, shown in Fig. 4 may be stationary as it is not needed in this manual operation. If the station tuned in is not desired, the explained method may be used to tune in other desired stations. The radio receiving set may be shut off entirely manually or operated as desired.

Now, considering the second or instant dialing unit, the operation is substantially as follows: by turning the switch or method selector knob 5 in Fig. 4 to the second position, which may be marked to suit. This position on the switch 5, Fig. 13, supplies both the radio receiving set as before and current to dialing member 10, contacts 27a and 27c completing the circuit to the solenoid 20, Fig. 13 when the contacts 27a and 27c are together. The finger is inserted in the properly identified hole in the dialing member 10 and the dial is rotated around the limit permitted by the finger stop 2i. In performing this operation, the rotation of the dial causes the finger operating gear 25 to force the finger operating gear rack 26 to raise a certain distance depending on the distance the dial 10 has been rotated. This is determined by the position on the dial 10 of the hole allotted to the station dialed or selected. In the upward travel of the finger operating gear rack 26 projection unit 26b passes the finger operating trip 27, not closing the circuit to the solenoid 20 until the finger operating rack 26 is on its downward or returned to its initial position. After performing this dialing or station selecting operation, the dial at the end of its travel has caused finger operating rack 26 to raise forcing the upper extension of the finger operating rack 26 into the slot of the selecting plate 12 that is in alignment with it pushing the finger member 14 contained therein up and causing it to extend out of the selecting plate 12 the correct distance. The dial member 10 is then released and allowed to return to its original position conveying with it in a downward motion the finger operating rack 26 causing the projection 26d to ride over the finger operating trip arm closing contacts 27a and 27c. This completes a circuit through the solenoid 20 and causes the solenoid core 20b to be drawn into the solenoid pushing the ratchet arm 20d to move the selector plate clockwise one tooth or division.

As previously explained in dialing, one finger member 14 was pushed out to a definite position depending on the location of the hole in the dial member 10. The finger member was placed and when the dial 10 was released, the large selector plate 12 moved clockwise one division or tooth on its periphery. This caused the extension 14f of the finger 14, Fig. 11, after being thrust out to a definite position to rotate with the selecting plate 12 and force one pair of contacts 15, Fig. 5 together completing a circuit to the motor 19, Fig. 5. The motor then rotates the driving condenser shaft 17 on which are mounted cams 18, condenser 16 and manual tuning index 6. Then the certain cam 18 lines up with the certain depressed contact 15, rides over and forces the arm 15c, Fig. 6 out of the spring retained normal position opening the contact 15, Fig. 6, and stopping or opening up the motor circuit, stopping the condenser on the desired position to tune in desired station. The contacts 15d, Fig. 6, have been opened by this same movement thereby placing in circuit the proper volume control resistor 23 shown in Figs. 13 and 14 bringing the volume to uniform or desired values as would be the case in tuning in any of the other stations which are each allotted a volume control 28, Figs. 13 and 14, making it possible to balance all perfectly and then make variations with the regular single volume control on the radio receiving set.

If it is desired to change the station, the other station is dialed in exactly as explained heretofore, the motor rotating the condenser immediately to a new station and the cam 18 stopping it at exactly the correct position and adjusting the volume on the new station. As each new station is dialed and solenoid 20 is energized, the ratcher arm 20d moves to the right, clearing the arm 20g is moved raising 20i and 20j high enough to clear the top of the finger member 14 that has just been played. This finger member 14 traveling one notch or division with the selecting plate 12 has come to rest under the clearer arm 20j which is forced downwardly by the return of the core 20b forcing the previously played finger member 14 back to the initial or neutral position in the selecting plate 12. Thus as the selecting plate 12 rotates as different stations are dialed, finger members 14 are automatically returned to the initial position. It will be here noted that when manual or instant dialing systems are used, the clock or definite timed impulse movement of the selector plate 12 is not used. It is only used in the automatic timed or program arrangement.

The operation to set up and play preselected and definite timed programs is as follows: The operator looks at the time indicated on the clock dial 11 if he wishes to start setting up the program at that time. If not desiring to start the program at the present time he proceeds by merely setting up the desired program to come on at the desired time. The selecting knob 5 is turned to automatic position or the number three position. The arranging knob 3, Fig. 1, is then grasped with the left hand and depressed, engaging or meshing teeth with the large selecting plate 12, Fig. 1. This also disengages the solenoid 20 and associated parts on the automatic clearer. The selecting plate 12 is turned so the desired program is set out properly on the A. M. or P. M. side of the member 12 as desired. Each hour on the selector plate 12 is divided into one quarter hour division making it possible to divide the hours into one quarter hour programs if desired. The rearranging knob 3, Fig. 1, is rotated as above described bringing the desired time of playing under the setting index 7, Fig. 1—say one P. M. The station desired—say W. G. N. is dialed on the dial 10, Fig. 1, as explained moving the finger member 14, Fig. 11, out of a definite position as explained heretofore. After this procedure the arranging knob 3 is rotated to say a point where two P. M. is lined up with the set index 7, Fig. 1, and a silent program is desired; dial member 10 then is rotated around to stop point with the index finger in the silent hole, which causes the finger member 14, Fig. 11, to be raised that definite amount and operate as explained hereinafter.

Now, if another program is desired at six P. M. the arranging knob 3 is rotated bringing six P. M. on the selecting plate to a position where it lines up with the index 7, Fig. 1, and K. F. I. dialed; the finger member 14 allotted to that selector is moved out a definite distance acting as hereinafter set forth. Now, if at ten P. M. it is desired to have radio receiving set shut off completely the arranging knob 3, Fig. 1, still grasped in the left hand during the arrangement is rotated causing ten P. M. to line up with the set index and the stop hole dialed on dial member 10, Fig. 1, a certain finger member 14 is raised a definite distance and operates as explained later. Now, if this is the entire program desired, rotate the arranging knob until the selecting plate 12 is in a position where one P. M. is opposite the playing index point 8 Fig. 1, and the arranging knob 3 released engaging a solenoid 20 and its mechanism and automatic clearer mechanism, Fig. 4, also disengaging from mesh the gear teeth of the arranging knob 3 from the teeth the periphery of the selecting plate 12. The selecting dial 12 time graduations are thus brought back to a position where the time is indicated under the play index pointer corresponds to actual time indicated on the face of the clock dial and as the minute hand at the clock 11 travels around to each successive quarter hour, the contact making arm 11d makes contact with the stationary contacts 11g, both shown on Fig. 2 of the drawings. As the selector plate 12 was brought back so that one P. M. is lined under play index pointer member 8, the finger member 14 still extended forces the proper pair of contacts 15 together, Fig. 5, closing the motor circuit and rotation of the condenser 16 to a point where the cam 18 opens the contacts 15 stopping the motor and at the same time adjusting the volume by opening the contacts 15d and 15e shown in Fig. 6, all of which was explained previously in the dial or instant tuning section. The radio receiving set would be playing the W. G. N. program as previously arranged.

Now, as the quarter hour contact arm 11d rotates making contact each quarter hour, the solenoid 20 moves the ratchet forward each quarter hour keeping time with the clock 11 by one quarter hour jump or period. As hereinbefore set up there would be three quarter hour movements of the selector plate 12 and at two o'clock, as previously arranged, the finger member 14 extended from the selector plate 12 would move around forcing together the pair of contact members 15, Fig. 5, that are allotted to the silent. These are shown on Fig. 14 as the second pair of contacts number 15 from the top.

The motor 19 would again turn the condenser shaft 17 to a point where the cam 18 would open the contacts 15 stopping the motor at that point also opening the normally closed contacts 15d and 15e breaking the circuit to the radio receiving set power supply and silencing the radio receiving set. The contacts 15d and 15e would be held open and the radio receiving set remain silent until the selector plate 12 had followed the electric impulses received every one quarter hour from the clock contact and reached the time of six P. M., when as explained hereinbefore, the finger member 14 has been extended from the selector plate 12 with the anticipated intention of bringing in K. F. I. at this time. At six P. M. the finger member 13 forces a contact 15, Fig. 6, together with the operating tuning motor, rotating the condensers and so forth until the cam 18 opens the motor circuit contacts 15 and the volume control contacts 15e and 15d. We now have K. F. I. tuned in as arranged.

The selector plate 12 continues to move by impulse each quarter hour until ten P. M. is reached, at which time the finger member 14 being extended from the selector plate 12, as previously explained in the set up, causes the contact 15 shown at the top of the contact assembly in Figs. 5 and 6 to open, these being shown as normally closed contacts and through which the operating current for the solenoid 20 of the radio receiving set and tuning motor has been supplied. The opening of this normally closed circuit by the finger member 14 allotted to the time ten P. M. stops the radio receiving set selector 12, solenoid tuning motor etc. completely and the program as outlined has been played as prearranged.

During the entire playing of the foregoing outlined program, the automatic clearer arm 20g, 20i and 20j connected to the solenoid may have been returning finger members 14 as they reach the clear index 9 during the quarter hour impulse or movement of the selector plate 12. It will be here noted that during the previous set up if an undesired station has been dialed by mistake it may be cleared or restored to neutral position by rotating the selector plate 12 by means of the arranging knob 3 until time division containing the finger member 14 that was incorrectly dialed lines up under clear indicator 9 and the center or clear knob 10b shown on Fig. 1 pressed in causing the arm 10i, shown in Fig. 9, to return the finger member 14 to neutral position. The selector plate 12 is then rotated back until the desired time of the program is under the set index 7 and the correct station or action is dialed on the dial 10.

The operation of the modified construction as shown in Fig. 14 of the drawings in which the operation is with a condenser, padder or trimmer tuning arrangement in place of the motor driven tuner as hereinbefore explained, is substantially the same as in the case of the instant dial tuning as explained previously except that when the dial 10 is operated and the finger member 14 projected from the selector plate 12 and is moved around by the solenoid 20 energized by the circuit through the contacts 27a and 27b when the finger operated gear rack 26 is returning to normal position, the finger member 14 moves around and depresses or forces together the contacts 15, Fig. 14, connecting the desired condenser padder previously tuned to a particular station. This station thus tuned in stays on until another station is dialed at which time another station is immediately tuned in in like manner. As each station is tuned in the volume is adjusted by the opening of contacts 15d and 15e, Fig. 14. The small set of contacts 31 behind the contacts 15, Fig. 14, are also closed or forced into contact and close the current supply circuit to the radio receiving set. These contact pairs are operated off the finger member 14 on the selecting plate 12.

The automatic preselecting and program playing in connection with the modified form with the padder condenser would be set up as explained in the motor driven tuner explanation with the exception that in the tuning of the program from one P. M. to two P. M. the selector plate 12 would be turned as before until one P. M. was under the set index 7 and the desired station dialed; the selector plate 12 would be moved forwardly one quarter hour and the desired station again dialed. This would be repeated once for each quarter hour for the desired station wished to be played and by so dialing one finger member 14 would have been projected for each quarter hour. The selector plate 12 would be rotated by rearranging the knob 3 until the time indicated by the setting index 7 was the time a program was desired. The desired station was then dialed again, once for each quarter hour desired as explained previously. If it is desired to have stop at a certain time, the selector plate 12 is turned until that time is indicated by the set index pointer 7. The stop hole in dial ten is then dialed. Now, to play this last set up program, the selector plate 12 is manually turned back until one P. M. is lined up with the play index 8 and the previously arranged program starts to come in for finger 14 is closing the contacts 15 on the selected circuit for the station dialed. These contacts 15 are held depressed until clock impulse moves selector plate 12 around one quarter hour and moves the next finger 14 around holding the same set of contacts 15 together and continuing the program as previously arranged. This continues until the selector plate has turned to a point where all previously extended finger members 14 have passed contacts 15 and as these are not extended the radio receiving set would be shut off or silent until the selector plate 12 had moved around to a point or time allotted to the next program and additional finger members 14 were extended from the selector plate 12. These would be played or used as explained previously.

When the time indicated on the selector plate 12 for stopping arrived, the finger member 14 extended to the stop position would open the normally closed contact pair shown on the top of the contact assembly, Fig. 14, and shut off the current supply stopping and disconnecting the program impulse solenoid 20 and radio receiving set. The clock, of course, would continue to run. The operation of the selecting knob 5 would be similar and it would be moved to proper point for the desired use of the device.

It will be here noted that automatic volume control 28, Figs. 13 and 14, consists of as many adjustable resistors as the stations for which the apparatus is built. These are all connected in series and are all individually normally short circuited by a pair of auxiliary contacts 15e and 15d, Fig. 6, arranged to open when the motor cam opens the normally open motor contacts which have been closed or pressed together by a finger member on the cam wheel. When this is done the radio receiving set volume circuit is through this resistor which has previously been adjusted for volume. It will further be noted that the clock switching device shown in Fig. 3 is not essentially mounted between the clock and the clock works or movement, but may be assembled onto the back of the clock movement.

The clock switching device shown in Fig. 3 consists of four fixed contacts 11g spaced 90° apart and commonly connected to a feed wire. The rotary arm 11d moves around once hourly and the extension shown slides up a ramp or incline 11h on the end of the micro-adjusting lever 11f shown in Fig. 3 and in Fig. 8. After riding across the end of the member 11f which has been accurately adjusted to determine the exact timing the end of the member 11d falls off of 11f onto the contact 11g making quick and accurately timed contact timing the radio program changes accurately. After traveling across 11g the arm 11d springs off 11g and opens the circuit again.

In Figs. 13 and 14 the radio receiving set circuits illustrated on radio receiving set R are power supply 29a, tuning or antenna circuit T1 and T2 and volume control circuits V1 and V2. On diagram 14, 5a and 5b are mounted to be controlled on the same shaft and actually form a double switching unit, one behind the other.

The circuits, as shown in Figs. 13 and 14, are traced as follows: First, as illustrated in Fig. 13 for manual setting with operation selector 5 on position marked "manual," a circuit is traced from line 1 at 29a through clock motor field 29 and back by way of 29b to line 2. This makes the clock a continuously operating time piece whether being used as a timing switch or not. A circuit is traced from L—1 at 29a directly to radio receiver at R—1 from radio receiver at R—2 through normally closed contacts at S—8 hence to the first contact 5c on the selector 5, to contact arm on same, hence through normally closed contacts on S—1, hence back to 29b and L—2.

The capacity circuit T—1 and T—2 is traced from radio receiver at T—1 through 16b to the variable capacitor gang 16, hence back through 16a to radio receiver at T—2.

The volume control circuit is traced from the radio receiver at V—1 through normally closed contacts on volume control switches S—13, S—12, S—11, S—10, S—9 and hence back to V—2 at the radio receiver.

In the event the normally closed contacts on one of the volume control switches S—9, S—10, S—11, S—12 or S—13 are open circuited by reason of stopping position of one of the cams 18, the circuit at that point would have inserted an adjustable volume control unit 18.

For instant dialing of stations and with reference to Fig. 13, the operation selector 5 is placed on the second or instant dialing position, the arm connecting the first two contacts together.

The clock motor field circuit is traced as heretofore explained.

The volume control circuit is traced as previously explained.

A circuit is traced from line 1 at 29a through actuating solenoid 20, through 20a, through manually operated momentary contacts 27a and 27c at S—14; hence the circuit is traced two ways. First, to common junction of first and second contact point and arm on operations selector 5. From the first contact 5c on 5 through normally closed contacts on S—8, hence to R—2 on radio receiver. From the rotary arm of S—5 the circuit is traced through the normally closed contacts on S—1, hence to 29b and line 2. From the radio receiver the circuit is traced from R—1 to 29a and line 1. Secondly, from momentary contact switch S—14 a circuit is traced through tuner motor 19 to normally open switches S—2, S—3, S—4, S—5, S—6, S—7, one of these being closed during tuning operation until opened by action of one of the cams 18. From these switches the circuit is to 29a and line 1. The radio receiver tuning circuit is traced as previously explained.

In operation with regard to Fig. 13 and the apparatus arranged to play automatically prearranged programs, the operation selector 5 is turned to position 5d connecting all contacts thereon to arm 5e therein connecting into the previously explained circuits, the clock timing or switch contact arrangement 11. The circuits are all traced as previously explained except for the additional circuit through member 11 which gives a regular momentary contact each quarter hour. During these momentary contact periods of timer 11, the circuit is traced from L—1 at 29a to solenoid coil 20, hence to contacts 11g and through center contact arm of 11 to contact point 5d on operation selector 5. From the rotary control arm 5e on selector 5 through normally closed contacts on S—1 hence to 29b and line 2.

In the modification shown in Fig. 14, the circuits are similar, the tuning motor having been eliminated and pretuned fixed condensers substituted for automatic tuning.

For manual tuning the operation selector 5a and 5b are turned to the first position. A circuit is traced from L—1 through normally closed contact on S—1 hence to center arm 5g on selector switch 5a, hence to first contact on 5a, hence to R—2 on radio receiver and from R—1 on radio receiver to L—2. The antenna circuit is traced from the antenna to center contact arm 5j on 5b to first contact 5k on 5b through manually operated tuning unit 16, hence to T—1 on receiver.

The volume control circuit in Fig. 14 is traced the same as described in the description of Fig. 13. For instant dialing automatic operation, the operation selector 5 is turned to the second points 5n and 5m on 5a and 5b respectively. A circuit is then traced from the antenna through switch arm and contact 5n on 5b, hence to switch group S—1, S—3, S—4, S—5, S—6 all normally opened and individually engageable and through engaged switch 3 one of selected previously tuned units 30, hence to T—1 on the radio receiver. The solenoid actuating circuit is traced from line 3 through solenoid 20, through normally open contacts at 27c and 27a on S—14 through contact 5m and switch arm 5g on 5a, hence back through normally closed contacts on S—1, and hence to line 1 at 29b.

The radio receiver circuit is traced from line 1 at 29b through normally closed contacts at S—1, hence to switch arm and contact 5m on operation selector 5a, hence to normally open switch group S—14, S—15, S—16, S—17, S—18, hence back to contact 5h on 5a, hence to R—2 on radio receiver, hence to 29a and line 2. In this operation the volume control would be traced the same as before. In the complete automatic preselected set up, the operation selector 5 would be set at last or extreme clockwise position 5p. This merely inserts the timing switch 11 in parallel with manually operated switch contacts 27c and 27b on S—14.

A circuit is traced from contact 27b to 27e when contacts 11g are engaged by contact arm on time switch 11. The antenna circuit is traced the same as last described as contact buttons 5m and 5p are commonly connected and the circuit is the same when contact arm of 5b is on point 5n or 5q.

Though we have shown and described a particular construction, combination and arrangement of parts and portions and certain modifications, we do not wish to be limited to this particular construction, combination, and arrangement, nor to the modification thereof, but desire to include in our invention the construction, combination and arrangement substantially as set forth in the appended claims.

Having thus described our invention, what we claim as new and desire to secure by Letters Patent is:

1. In an automatic preselecting and radio receiving tuning apparatus of the class described, the combination of a selector member and a pivotally mounted alternate contact switch member, said selector member having a portion thereof adapted and arranged to operate said switch member, means causing said portion to operate said switch member, and means connecting said switch member to a tuning device, said tuning device having means in connection therewith to alternately operate said switch member in opposed relation with said selector member.

2. In an automatic preselecting apparatus of the class described, the combination of a revoluble selector member and a pivotally mounted alternate contact switch member, said selector member having a portion thereof adjustably mounted thereon, means to project and retract said portion into and out of a line of interference with said switch member, means to rotate said selector member causing said portion when in interfering position to operate said switch member, and means connecting said switch member to a rotatable tuning device, said rotatable tuning device having means in connection therewith to alternately operate said switch member in opposed relation with said selector member.

3. In an automatic timing and preselecting apparatus of the class described, the combination of a revoluble disc-like selector member, a switch member, said selector member having a radially shiftable portion thereof adapted and arranged to operate said switch member outwardly of the periphery of said selector member, a gear like surface on said selector member, an arm having means for engagement with said gear like surface, means attached to said arm to move said first means out of engagement with said gear like surface, means to deliver oscillating impulses to said arm causing said first means to move said selector member unidirectionally, thereby causing said radially shiftable portion to operate said switch member and means connecting said switch member to a tuning device, said tuning device having means in connection therewith to operate said switch member.

4. In an automatic timing and preselecting apparatus of the class described, the combination of a disc-like selector member having a portion thereof radially adjustably mounted thereon, dial operated reciprocally mounted means to control the position of said portion, a switch in connection with said means, solenoid means to rotate said selector member, said second means being actuated by said first means.

5. In an automatic timing and preselecting and tuning device of the class described, the combination of an annular selector member, a switch member adjacent the periphery of said selector member, shiftable elements on said selector member, means to adjust the position of said shiftable elements relative to the periphery of said selector member whereby an adjustable outline is created by said elements, means causing the elements in said outline to operate said switch member and means connecting said switch member to a radio receiver tuning device for tuning said radio receiver to a desired signal, said tuning device including means in connection therewith to operate said switch member.

6. In an automatic timing and preselecting apparatus of the class described, the combination of a selector member having a first portion and a second portion, said first portion having a surface, said surface having time division portions circumferentially distributed thereupon and a plurality of separate concentrically related translucent annular division portions transversing said time division portions, said second portion comprising individually movable elements adjacent said surface, and means on said elements adapted and arranged to form indications on said surface, means to move said elements thereby creating an indicating pattern which is indicative of the position of said elements.

7. A selector member having a first portion and a second portion, said first portion having a substantially flat surface, said surface having time division portions circumferentially distributed thereupon and a plurality of separate concentrically related translucent annular division portions crossing said time division portions, said second portion comprising individually movable elements adjacent said surface, one each of said elements in alignment with each of said time division portions, index means on said elements and means causing said elements to traverse said annular division portions whereby a variable pattern can be formed by said index means.

DONALD C. PORTER.
FRANK W. SLOAN.